C. W. FLETCHER AND D. C. SPRUANCE.
FLEXIBLE TUBE.
APPLICATION FILED AUG. 11, 1917.
1,315,548.
Patented Sept. 9, 1919.
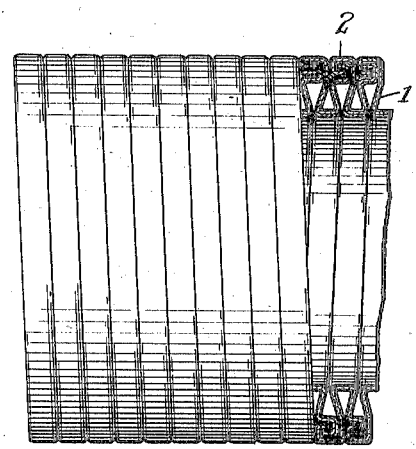
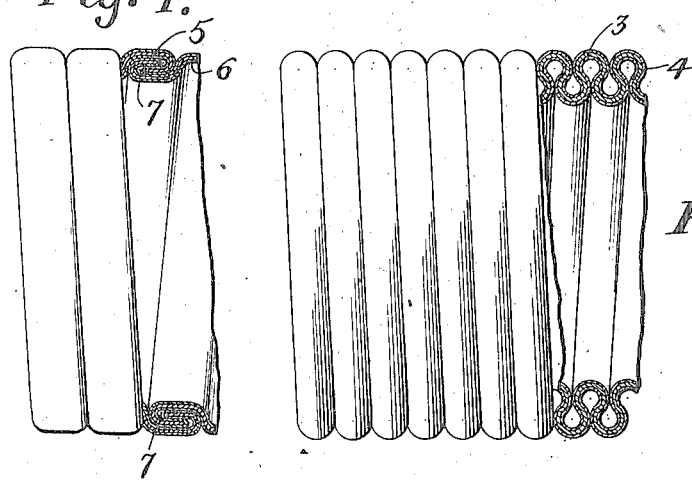
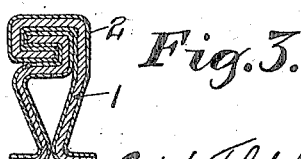
C. W. Fletcher and
Daniel C. Spruance
Inventors
By their Attorney
Thomas Howe

UNITED STATES PATENT OFFICE.

CHARLES W. FLETCHER, OF ENGLEWOOD, NEW JERSEY, AND DANIEL C. SPRUANCE, OF NEW YORK, N. Y., ASSIGNORS TO TITEFLEX METAL HOSE CORPORATION, A CORPORATION OF NEW YORK.

FLEXIBLE TUBE.

1,315,548.  Specification of Letters Patent.  Patented Sept. 9, 1919.

Application filed August 11, 1917. Serial No. 185,671.

*To all whom it may concern:*

Be it known that we, CHARLES W. FLETCHER and DANIEL C. SPRUANCE, citizens of the United States, residing at Englewood, county of Bergen, and State of New Jersey, and city, county, and State of New York, respectively, have invented new and useful Improvements in Flexible Tubes, of which the following is a specification.

This invention relates to flexible tubes.

Where tube is corrugated and the flexibility of the tube depends upon the movement of the corrugation sides toward and away from each other, it is desirable that the metal should be thin so as to permit of easy flexibility and further, thinness of the metal contributes to the ease of formation of the tube by means of suitable machines. While thinness of the main metal of the tube is thus desirable, the very thinness makes the tube more vulnerable to injury by coming in contact with external objects and also renders the tube more liable to be destroyed by corrosion. Iron or steel is a material which is admirably adapted to form the corrugated flexible tube by reason of its strength, resilience and other physical characteristics. It is, however, subject to the disadvantage of corrosion and injury as above referred to. The corrosion can be prevented by covering the corrugated tube with a non-corrosive material but such covering or coating adds to the thickness of the walls of the tube so that if it has any considerable stiffness of its own, the tube is thereby stiffened so as to materially detract from its flexibility and also increase the difficulty of manipulation by machines in forming the tube.

According to the present invention the flexible tube of corrodible material is coated with a non-corrodible material which is so plastic as not to unduly increase the stiffness of the tube when the tube is corrugated and depends upon the movement of the corrugation sides for flexibility whereby the tube is protected from corrosion and the thickness of the tube walls resistant to collision against external objects is increased without unduly detracting from the flexibility of the tube. We have found that lead or an alloy thereof is admirably adapted to provide a coating for a tube formed of ferrous metal, that is iron or steel. The lead by reason of its extreme pliability and softness does not interfere with the flexibility of the tube, produced by movement of corrugation sides, the other advantages stated. Moreover, these characteristics of lead permit the material to be readily manipulated in tube making operations as for instance by the apparatus of the Patent No. 1,120,269, L. H. Brinkman, issued December 8th, 1914 for making an integrally formed corrugated tube and the apparatus of Patent No. 1,198,391, L. H. Brinkman issued September 12th, 1916, wherein a flexible corrugated tube is made from a strip. In fact the coating increases the ease of manipulation by imparting lubrication to the operation. Furthermore where the corrugated tube is formed from a helical strip as in the Brinkman Patent No. 1,198,391, the lead coating forms a soft material in the joint which makes the compacting, solidifying and tightening of the joint more easy of accomplishment.

In those tubes formed of helically disposed strips wherein flexibility is provided by sliding in the joints between adjacent convolutions, the coating of the strip serves as a lubricant during the formation of the tube by suitable machines and also forms a lubricant for the sliding parts in the joint so that the flexing is easier, smoother and free from creaking noises; and of course the characteristics of corrosion preventing and protection from external injury as referred to above, apply as well to sliding joint tubes.

While lead has been the metal principally referred to as the material of the coating, other metals, equivalent in this relationship, are considered to be within the invention.

Other and ancillary objects of the invention will appear hereinafter.

In the accompanying drawings which illustrate the invention—

Figure 1 is a side elevation partly in section, of a corrugated flexible tube formed from a strip having a fixed joint and embodying the invention, this tube being capable of formation in the apparatus of the Brinkman Patent No. 1,198,391 above referred to.

Fig. 2 is a side elevation partly in section of an integrally formed corrugated tube such as is referred to in and which may be formed by the apparatus of the Brinkman Patent No. 1,120,269 above referred to.

Fig. 3 is a fragmentary section on an enlarged scale, showing more clearly in detail the structure of the tube of Fig. 1, and Fig. 4 is a side elevation, partly in section, of a tube comprising a helically disposed strip, flexibility being provided by sliding in the joints between adjacent convolutions.

Referring to the drawings, and first to Figs. 1 and 3 the tube is formed from a strip 1 of steel to which has been applied a coating 2 of an alloy consisting in a large part of lead. A suitable composition of the coating has been found to be lead 75 per cent., tin 15 per cent., and antimony 10 per cent. This may be applied to the strip in the following manner. The strip is first passed through a potash solution for cleaning it and then through rinsing water for removing the potash. The strip is then passed through a solution as follows: muriatic acid 20 per cent. commercial (80 per cent. water and 20 per cent. pure acid) is mixed with an equal quantity of water and to 10 gallons of this mixture is added one pound of bichlorid of mercury and one pound of sal ammoniac.

After passing through this solution the strip is passed into the bath of coating metal which may be constituted of 75 per cent. of lead, 15 per cent. of tin and 10 per cent. of antimony. As it passes into this bath of coating metal, which is molten and maintained at a temperature of about 650 degrees C., it passes through a flux floating upon the surface of the coating metal. This flux may consist of a 40 per cent. commercial solution of zinc chlorid placed on the bath to which is added a handful of sal ammoniac and also a handful of ordinary grain flour the latter making the mixture "puffy" as it is called; that is it makes a more tenacious dough-like substance. On emerging from the coating bath the strip is passed between spaced wipers of metal which are maintained approximately at the temperature of the bath. These wipers smooth down the coating so that the strip has the desired dimensions and is smooth. After this the coating is chilled by directing a blast of air against it so that it is set into the smooth and dimensioned condition in which it has been placed by the wipers.

The strip thus coated is formed into the tube by helically forming it and interfolding the edges of the adjacent convolutions into fixed and fluid tight relation. This may be accomplished by the apparatus and in the manner described in the Brinkman Patent No. 1,198,391. The tube may then be compressed endwise to reflex the sides of the groove in the tube with relation to its bottom when the tube will be as shown in Figs. 1 and 2 of the drawings.

Referring to Fig. 2 the tube comprises an integral structure 3 of steel having a coating 4 of the same composition as the coating 2. The corrugated tube may be formed by the apparatus and in the manner as described in the Brinkman Patent No. 1,120,269 and the steel constituting the main portion of the tube is treated in the same manner as described in connection with the strip of Figs. 1 and 2 to provide it with its coating.

Referring to Fig. 4, the tube comprises a steel strip 5, having a coating 6 of the same composition and applied in the same manner as the coating 2. The strip is formed into a helix with the edges of adjacent convolutions interfolded into a joint having clearance 7 permitting relative sliding of the joint parts to allow flexing of the tube.

While the invention has been illustrated in what are considered its best embodiments, it may be embodied in other structures without departing from its spirit. It is not therefore limited to the structures shown in the drawings.

What we claim is:

1. A flexible corrugated metal tube wherein flexibility is provided by movement of the sides of the corrugations toward and away from each other having a coating of metal of greater plasticity than the metal of the tube.

2. A flexible corrugated metal tube wherein flexibility is provided by movement of the sides of the corrugations toward and away from each other having a coating of non-corrodable metal of greater plasticity than the metal of the tube.

3. A flexible corrugated metal tube wherein flexibility is provided by movement of the sides of the corrugations toward and away from each other having a coating containing lead.

4. A flexible corrugated tube wherein flexibility is provided by movement of the sides of the corrugations toward and away from each other of ferrous metal having a coating of metal containing lead.

5. A flexible corrugated metal tube wherein flexibility is provided by movement of the sides of the corrugations toward and away from each other comprising a helically coiled strip and having a longitudinal groove and with the edges of adjacent convolutions interfolded and having a coating of non-corrodable metal of greater plasticity than the metal of the tube.

6. A flexible corrugated metal tube wherein flexibility is provided by movement of the sides of the corrugations toward and away from each other having a helically formed strip of ferrous metal having a longitudinal groove and with the edges of adjacent convolutions interfolded and having a coating containing lead.

7. A flexible tube comprising a helically coiled strip having the edges of adjacent convolutions in engagement and having a coating of metal containing lead.

8. A flexible tube comprising a helically coiled strip having the edges of adjacent convolutions joined together by a joint having clearance permitting relative sliding of the joint parts to allow flexing of the tube, said strip having a coating of metal containing lead.

9. A flexible corrugated tube comprising a helically coiled strip of ferrous metal coated with a leaden metal, said strip having the edges of adjacent convolutions interfolded and a longitudinal groove outside the interfolded portions, flexibility being provided by movement of the sides of said groove toward and away from each other.

In testimony whereof we have signed this specification this 31st day of July, 1917.

CHARLES W. FLETCHER.
DANIEL C. SPRUANCE.